US012466552B2

United States Patent
Freiheit et al.

(10) Patent No.: US 12,466,552 B2
(45) Date of Patent: Nov. 11, 2025

(54) PILOT-CONTROLLED POSITION GUIDANCE FOR VTOL AIRCRAFT

(71) Applicant: BETA AIR, LLC, South Burlington, VT (US)

(72) Inventors: Collin Freiheit, Burlington, VT (US); David L. Churchill, Winooski, VT (US); Hamid-Reza Ossareh, South Burlington, VT (US); Nicholas Moy, Burlington, VT (US)

(73) Assignee: BETA AIR LLC, South Burlington, VT (US)

( * ) Notice: Subject to any disclaimer, the term of this patent is extended or adjusted under 35 U.S.C. 154(b) by 824 days.

(21) Appl. No.: 17/365,512

(22) Filed: Jul. 1, 2021

(65) Prior Publication Data
US 2024/0317395 A1  Sep. 26, 2024

(51) Int. Cl.
*B64C 29/00* (2006.01)
*B64C 39/02* (2023.01)
*G05D 1/00* (2024.01)
*G08G 5/54* (2025.01)

(52) U.S. Cl.
CPC .......... *B64C 29/00* (2013.01); *B64C 29/0025* (2013.01); *B64C 29/0033* (2013.01); *B64C 39/024* (2013.01); *G05D 1/102* (2013.01); *G08G 5/54* (2025.01)

(58) Field of Classification Search
CPC .......... G05D 1/102; G08G 5/025; G08G 5/54; B64C 39/024
See application file for complete search history.

(56) References Cited

U.S. PATENT DOCUMENTS

| | | |
|---|---|---|
| 8,364,329 B2 | 1/2013 | Boorman |
| 9,383,214 B2 | 7/2016 | Shrinath |
| 9,805,607 B2 | 10/2017 | Gong |
| 9,983,584 B2 | 5/2018 | Bruggemann |
| 10,713,957 B2 | 7/2020 | Goel |
| 10,921,825 B2 | 2/2021 | Koch |
| 2014/0018979 A1 | 1/2014 | Goossen |

(Continued)

FOREIGN PATENT DOCUMENTS

| | | | |
|---|---|---|---|
| AU | 2014100587 A4 * | 7/2014 | .......... B61L 27/0027 |
| WO | 2019116101 A1 | 6/2019 | |

OTHER PUBLICATIONS

Title: Autonomous flight and navigation of VTOL UAVs: from autonomy demonstrations to out-of-sight flights by: Fabiani Date: Oct. 13, 2006.

*Primary Examiner* — Jason Holloway
*Assistant Examiner* — Christopher A Buksa
(74) *Attorney, Agent, or Firm* — Lee & Hayes, P.C.

(57) ABSTRACT

A system for pilot-controlled position guidance configured for use in a vertical take-off and landing (VTOL) aircraft, the system including a VTOL aircraft. The system including a graphical user interface (GUI) coupled to the VTOL aircraft, where the GUI is configured to receive an objective from a user as a function of the user's interaction with the GUI, transmit the objective to a controller, receive a control input from the controller, and display the control input to the user. The system also including a controller where the controller is configured to receive the objective for the GUI, calculate a control input as a function of the objective, and transmit the control input to the GUI.

20 Claims, 12 Drawing Sheets

(56) References Cited

U.S. PATENT DOCUMENTS

| | | |
|---|---|---|
| 2019/0011921 A1 | 1/2019 | Wang |
| 2019/0235502 A1 | 8/2019 | Lindsey |
| 2020/0180754 A1 | 6/2020 | Schonfelder |
| 2020/0234601 A1 | 7/2020 | Ivanov |
| 2021/0004006 A1* | 1/2021 | Graves .............. B60W 30/0956 |
| 2021/0082295 A1 | 3/2021 | Surace |
| 2021/0089134 A1 | 3/2021 | Tran |
| 2021/0334630 A1* | 10/2021 | Lambert ................ G06N 3/047 |
| 2022/0309931 A1* | 9/2022 | T .......................... G08G 5/0026 |

* cited by examiner

PILOT-CONTROLLED POSITION GUIDANCE FOR VTOL AIRCRAFT

FIELD OF THE INVENTION

The present invention generally relates to the field of vertical take-off and landing (VTOL) aircraft. In particular, the present invention is directed to system and method for pilot-controlled position guidance for VTOL aircraft.

BACKGROUND

Vertical take-off and landing aircraft, also known as VTOL aircraft, are difficult to efficiently position above a specific location, such as a landing pad, and obstacles surrounding the location, such as in an urban environment, can make the approach challenging.

SUMMARY OF THE DISCLOSURE

In an aspect a system for pilot-controlled position guidance configured for use in a vertical take-off and landing (VTOL) aircraft, the system including a VTOL aircraft. The system includes a graphical user interface (GUI) coupled to the VTOL aircraft, where the GUI is configured to receive an objective from a user as a function of the user's interaction with the GUI, transmit the objective to a controller, receive a control input from the controller, and display the control input to the user. The system also includes a controller where the controller is configured to receive the objective for the GUI, calculate a control input as a function of the objective, and transmit the control input to the GUI.

In another aspect a method for pilot-controlled position guidance configured for use in a vertical take-off and landing (VTOL) aircraft. The method includes receiving, at the GUI, an objective from a user as a function of the user's interaction with the GUI, transmitting, at the GUI, the objective to a controller, receiving, at the GUI, a control input from the controller, and displaying, at the GUI, the control input to the user. The method also includes receiving, at the controller, the objective from the GUI, calculating, at the controller, a control input as a function of the objective, and transmitting, at the controller, the control input to the GUI.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for pilot-controlled position guidance (PCPG) for VTOL aircraft. Embodiments of the systems and methods disclosed herein describe a pilot-controlled position guidance for VTOL aircraft by a novel process which adapts the flight plan to the possible actions by the user that would deviate from the flight plan created as a function of the user's input. In one embodiment, the set of maneuvers required to achieve an objective may be modified as the user perform maneuvers that differ from the set of maneuvers originally calculated by a controller as a function of the user's input. In another embodiment, the controller may display additional maneuvers required to achieve an objective as a function of the user deviating from the previously calculated flight plan. In other embodiments, a waypoint between the user's location and the objective may be added and a new flight plan may be calculated as a function of the added waypoint by the user. Embodiments may include a method for modifying a flight plan, for instance by modifying or adding maneuvers required to achieve an objective as a function of the user deviating from previously calculated flight plan.

Figure 1:
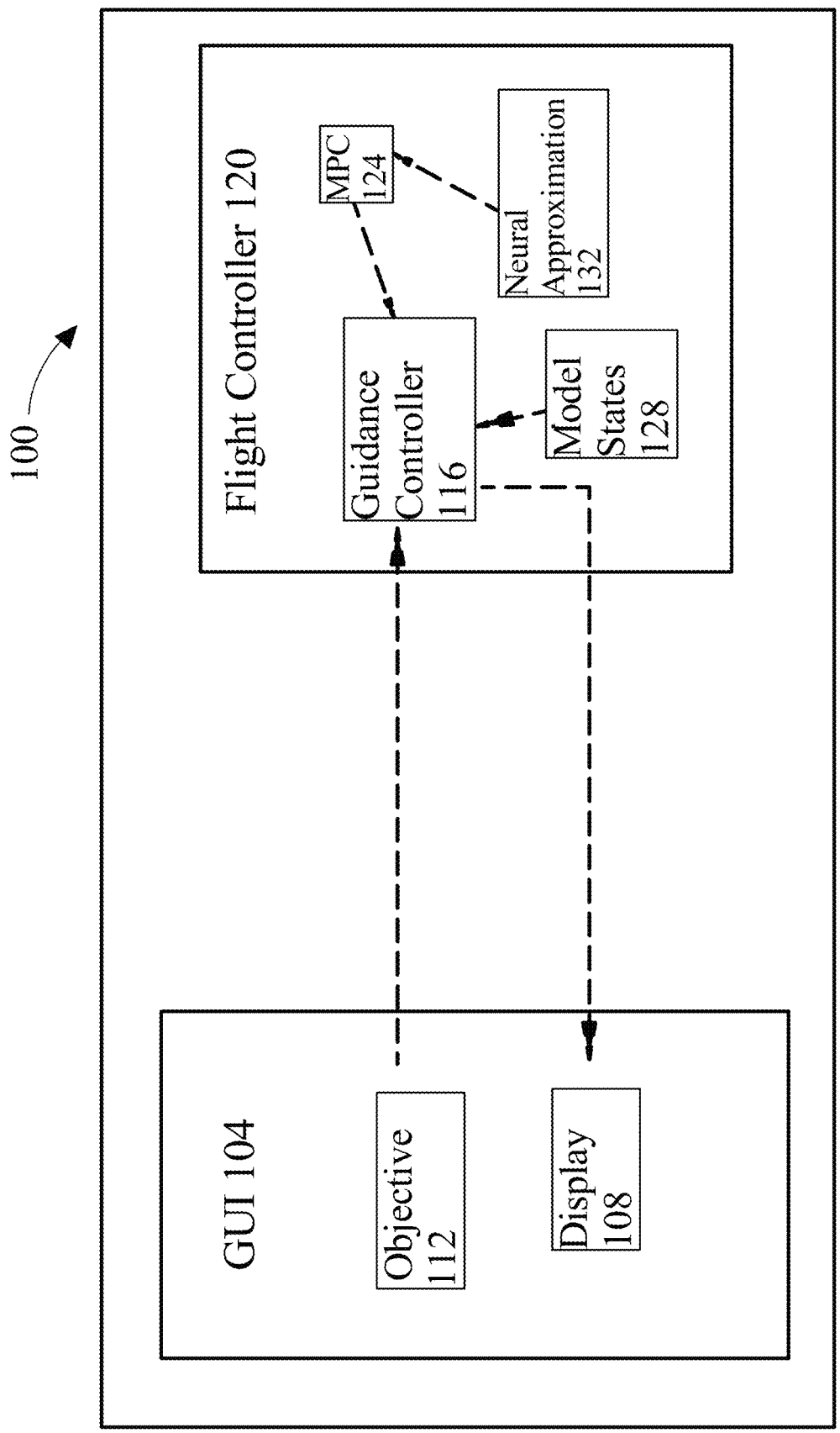
FIG. 1 is a block diagram illustrating a system for pilot-controlled positioning guidance configured for use in a vertical take-off and landing (VTOL) aircraft.

Referring now to FIG. 1, illustrates an exemplary block diagram of system 100 for pilot-controlled position guidance configured for use in a vertical take-off and landing (VTOL) aircraft, the VTOL aircraft is described in detail further below. As used herein, a vertical take-off and landing (VTOL) aircraft is an aircraft that can take off, and land vertically; a VTOL aircraft may be able to hover as well. A VTOL, as used herein, is an aircraft typically using a fuel source, of a plurality of fuel sources to power the aircraft. In order to optimize the power and energy necessary to propel the aircraft. VTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight. An exemplary embodiment of a VTOL aircraft is described further below. In an embodiment, the VTOL aircraft may be an electric VTOL.

Still referring to FIG. 1, a graphical user interface (GUI) 104 is incorporated in the VTOL aircraft. As described herein, a graphical user interface is a form of user interface that allows users to interact with the controller through graphical icons and/or visual indicators. The user may, without limitation, interact with graphical user interface 104 through direct manipulation of the graphical elements. Graphical user interface 104 may be configured to display at least an element of a flight plan, as described in detail below. As an example, and without limitation, graphical user interface 104 may be displayed on any electronic device, as described herein, such as, without limitation, a computer, tablet, remote device, and/or any other visual display device. Display 108 is configured to present, to a user, information related to the flight plan. Display 108 may include a graphical user interface, multi-function display (MFD), primary display, gauges, graphs, audio cues, visual cues, information on a heads-up display (HUD) or a combination thereof. Display 108 may include a display disposed in one or more areas of an aircraft, on a user device remotely located, one or more computing devices, or a combination thereof. Display 108 may be disposed in a projection, hologram, or screen within a user's helmet, eyeglasses, contact lens, or a combination thereof. GUI 104 may display the flight plan in graphical form. Graphical form may include a two-dimensional plot of two variables that represent data received by the controller, such as past maneuvers and predicted future maneuvers. In one embodiment, GUI 104 may also display the user's input in real-time.

Still referring to FIG. 1, GUI 104 is configured to receive an objective 112 from a user. An objective 112 may be an action or destination desired by the user. In an embodiment, the objective may be a maneuver desired by the user. The objective 112, in an embodiment, may be a specific point in space. The objective 112 may also be, in an embodiment, a landing location. The objective 112 may further be an intermediate landing location between the user location and the desired landing location. A user may be a pilot or any person in control of the VTOL aircraft.

With continued reference to FIG. 1, GUI 104 may receive input from the user interacting with a computing device. Interaction of user with GUI 104 may be through an input device. Examples of an input device include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, an inceptor stick, and any combinations thereof. GUI 101 may receive input from user through standard I/O interface such as ISA (Industry Standard Architecture), PCI (Peripheral Component Interconnect) Bus, and the like. GUI 104 may receive input from user through standard I/O operation. In one embodiment, GUI 104 may further receive input from user through optical tracking of motion. In one embodiment, GUI 104 may further receive input from user through voice-commands. GUI 104 may further use event-driven programming, where event listeners are used to detect input from user and trigger actions based on the input. One of ordinary skill in the art, upon reading the entirety of this disclosure would appreciate the variety of input controls that may be present in a VTOL aircraft consistent with the present disclosure. Inceptor stick may be consistent with disclosure of inceptor stick in U.S. patent application Ser. No. 17/001,845 and titled "A HOVER AND THRUST CONTROL ASSEMBLY FOR DUAL-MODE AIRCRAFT", which is incorporated herein by reference in its entirety.

Still referring to FIG. 1, the system further include a guidance controller 116. Guidance controller 116, as described herein, may be incorporated in the flight controller 120 or may be a component of the flight controller 120. Guidance controller 116 may further be a sub-controller or co-controller of the flight controller 120. Guidance controller 116 may have access to any element of the fight controller 120. In one embodiment, guidance controller 116 may have access to sensory information from the flight controller 120. In one embodiment, guidance controller may have access to fuel level information. In a nonlimiting example, guidance controller 116 may use the fuel level information to alter the suggested set of maneuvers based on the level of fuel available. As used in this disclosure a "flight controller" is a computing device of a plurality of computing devices dedicated to data storage, security, distribution of traffic for load balancing, and flight instruction. Flight controller 120 may include any flight controller as described with detail further below.

Still referring to FIG. 1, in one embodiment, guidance controller 116 may utilize data from flight controller 120 to return information to the GUI 104 related to the suggested maneuvers to be performed. In one embodiment, guidance controller 116 may further transmit to GUI 104 specific movements to be performed by the user. In a nonlimiting example, guidance controller 116 may send directions, with the suggested maneuver, of specific motions and actions to be performed by the user.

Still referring to FIG. 1, GUI 104 is further configured to transmit the objective 112 to a guidance controller. GUI 104, through a computing device, may interface or connect with guidance controller via network interface device. Network interface device may be utilized for connecting guidance controller 116 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device.

With continued reference to FIG. 1, GUI 104 receives a control input from the guidance controller 116. In one embodiment, the control input is a flight plan as a function of the objective. Flight plan, as used herein, may refer to the optimal set of at least a flight maneuver to be performed by a user that minimizes the cost to reach an objective. In some embodiments, flight plan may also include information related to obstacles and restricted zones that must be avoided.

As described herein, and with continued reference to FIG. 1, at least a flight maneuver may include takeoff, landing, stability control maneuvers, emergency response maneuvers, regulation of altitude, roll, pitch, yaw, speed, acceleration, or the like during any phase of flight. As an example, and without limitation, at least a flight maneuver may include a flight plan or sequence of maneuvers to be performed during a flight plan. As a further example and without limitation, at least a flight maneuver may include a runway landing. A runway landing, as defined herein, is a landing in which a fixed-wing aircraft, or other aircraft that generates lift by moving a foil forward through air, flies forward toward a flat area of ground or water, alighting on the flat area and then moving forward until momentum is exhausted on wheels or, in the case of landing on water, pontoons; momentum may be exhausted more rapidly by reverse thrust using propulsors, mechanical braking, electric braking, or the like. As a further non-limiting example, a flight maneuver may include a vertical landing protocol. Vertical landing protocol may include, without limitation, a rotor-based landing, such as one performed by rotorcraft such as helicopters or the like. In an embodiment and without limitation, vertical landing protocols may require greater expenditure of energy than runway-based landings. Vertical landing protocol may, for instance and without limitation, require substantial expenditure of energy to maintain a hover or near-hover while descending, while runway-based landings may, as a non-limiting example, require a net decrease in energy to approach or achieve aerodynamic stall.

With continued reference to FIG. 1, GUI 104 displays the control input to the user.

Still referring to FIG. 1, guidance controller 116 is configured to receive the objective from the GUI. In one embodiment, guidance controller 116 may be communicatively connected to a computing device. As used herein, "communicatively connecting" is a process whereby one device, component, or circuit is able to receive data from and/or transmit data to another device, component, or circuit; communicative connection may be performed by wired or wireless electronic communication, either directly or by way of one or more intervening devices or components. In an embodiment, communicative connecting includes electrically coupling an output of one device, component, or circuit to an input of another device, component, or circuit. Communicative connecting may be performed via a bus or other facility for intercommunication between elements of a computing device as described in further detail below in reference to FIG. 12. Communicative connecting may include indirect connections via "wireless" connection, low power wide area network, radio communication, optical communication, magnetic, capacitive, or optical coupling, or the like. Controller may include any computing device or combination of computing devices as described in detail below in reference to FIG. 12. Controller may include any processor or combination of processors as described below in reference to FIG. 12. Controller may include a microcontroller. Controller may be incorporated in the VTOL aircraft or may be in remote contact.

With continued reference to FIG. 1, guidance controller 116 is configured to calculate a control input as a function of the objective 112. In an embodiment, the guidance controller 116 may use machine learning algorithms 800 to perform calculations. Machine learning algorithms 800 are described in detail further below.

Still referring to FIG. 1, guidance controller, in an embodiment, may use an Adaptive Model Prediction Control (MPC) algorithm 124 to perform calculation of flight plan as a function of the objective set by user, this calculation may be performed by using model states 128. "Model states" 128, in one embodiment, may refer to predicted states used by the guidance controller 116, wherein the predicted states are used to calculate the optimal control sequences that minimize the cost of reaching the objective. Guidance controller 116 may use, in one embodiment, an internal model of the user. Guidance controller may further utilize a dynamic tracking model of the user.

In one embodiment, and with continued reference to FIG. 1, guidance controller 116 may further combine the use of MPC 124 with a Neural Approximation 132 method. In one embodiment, Neural Approximation 132 may reduce the computational capacity required to perform the calculation by the controller.

Still referring to FIG. 1, guidance controller 116 is configured to transmit the control input to the GUI 104. Control input is described above.

Figure 2:
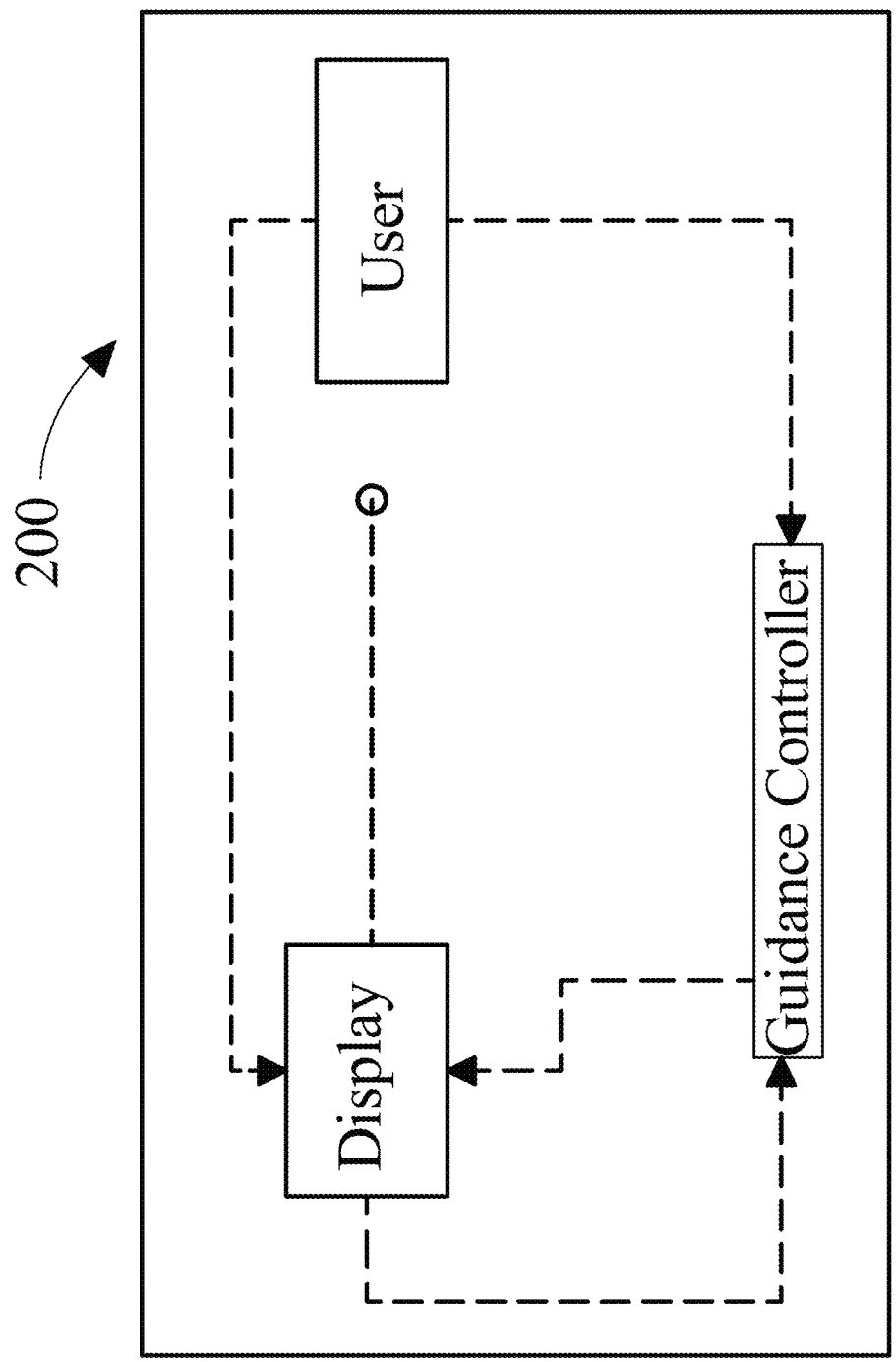
FIG. 2 illustrates particular implementations of various steps of a method of calculating, at the controller, a control input as a function of an objective.

Referring now to FIG. 2, an exemplary diagram of the predictive calculation performed by the guidance controller 116 is illustrated. As previously disclosed, guidance controller 116 is configured to calculate a control input as a function of the objective. In some embodiments, guidance controller 116 may utilize model states 128 to predict deviations from the flight plan and adjust calculation as a function of that deviation.

Still referring to FIG. 2, controller takes initial input from user through the GUI and calculates an optimal flight plan to reach objective. As described above, in some embodiments, controller may utilize Adaptive Model Prediction Control (MPC) 124 algorithm to calculate the optimal set of maneuvers that minimizes the cost to reach the objective 112.

With continued reference to FIG. 2, guidance controller may continuously receive input related to user actions until objective is reached or PCPG system is turned off. Examples of technologies used to track user location or actions relative to the flight plan may include GPS technology, cell towers on the ground, aircraft sensors, or the like. Upon deviation by user from flight plan, controller transmits a modified flight plan to GUI.

Alternatively, or additionally, and with continued reference to FIG. 2, guidance controller may utilize external factors to modify flight plan, such as weather information or presence of another aircraft.

Figure 3:
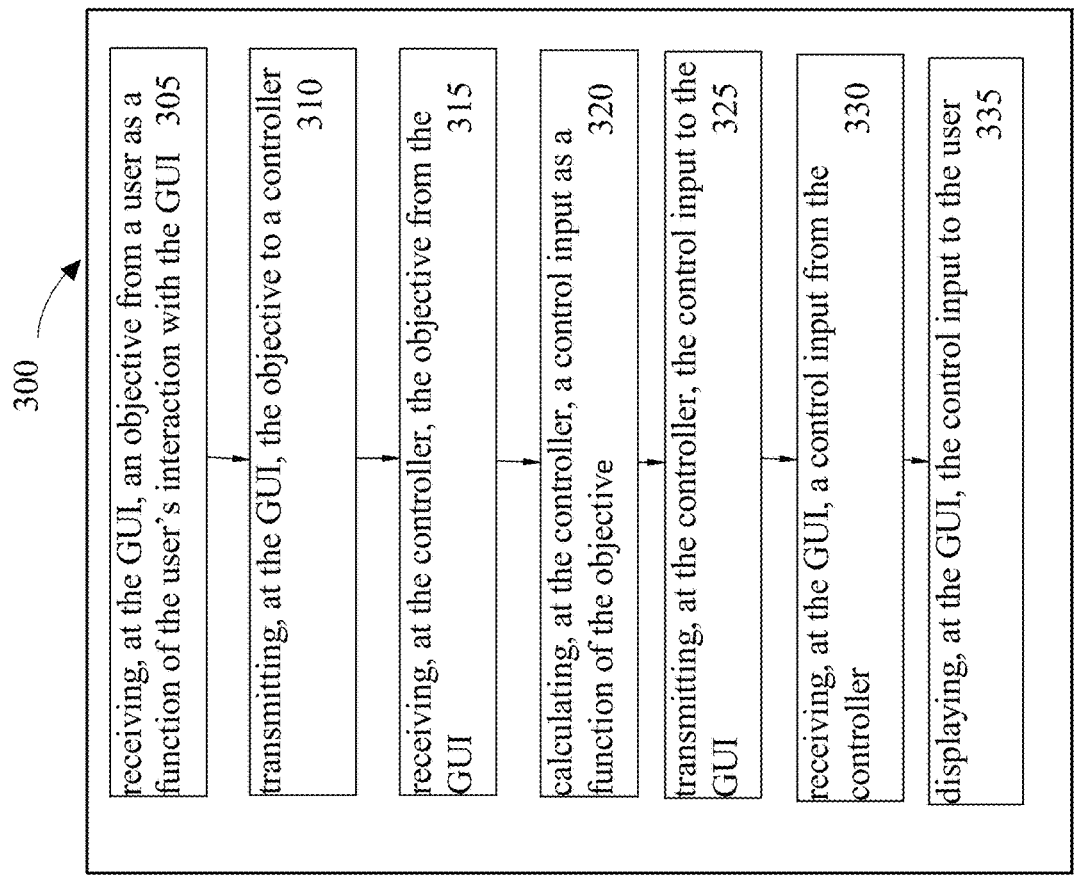
FIG. 3 is a flow diagram illustrating a method for pilot-controlled positioning guidance configured for use in a vertical take-off and landing (VTOL) aircraft.

Now referring to FIG. 3, a method in flow diagram form for pilot-controlled positioning guidance configured for use in VTOL aircraft 1100 is illustrated. In one embodiment, the VTOL aircraft is an electric VTOL aircraft. At 305, method 300 includes receiving, at the GUI, an objective from a user as a function of the user' interaction with the GUI. In some embodiments, the objective may be a maneuver. In other embodiments, the objective may be a point is space, and objective may be, in some embodiments, a landing location. In one embodiment, an intermediate landing location may be added between the user location and the objective.

At 310, with continued reference to FIG. 3, method 300 includes transmitting, at the GUI 104, the objective to a guidance controller 116. Objective may include a maneuver, a point in space, a landing location, an intermediate landing location, and the like.

At 315, with continued reference to FIG. 3, method includes receiving, at the guidance controller 116, a control input from the GUI 104. Control input may include the objective, weather data, sensor data, other external data, such as restricted zones, and the like.

At 320, with continued reference to FIG. 3, method includes calculating, at the guidance controller 116, a control input as a function of the objective. Guidance controller 116 may further use model states 128 to perform calculation. In one embodiment, controller utilizes an Adaptive Model Prediction Control (MPC) 124 algorithm. Controller utilizes an internal model of the user, in one embodiment. In one embodiment, controller utilizes a dynamic tracking model of the user. Controller, in one embodiment, further utilizes a Neural Approximation 132 method with MPC 124.

Still referring to FIG. 3, at 325, method 300 includes transmitting, at the controller, the control input to the GUI 104. Control input may include immediate previously performed maneuver, suggested maneuver, maneuver currently performed by the user, directional path, and the like.

At 330, with continued reference to FIG. 3, method 300 includes receiving, at the GUI 104, a control input from the guidance controller 116.

Still referring to FIG. 3, at 335, method 300 includes displaying, at the GUI, the control input to the user.

Figure 4:
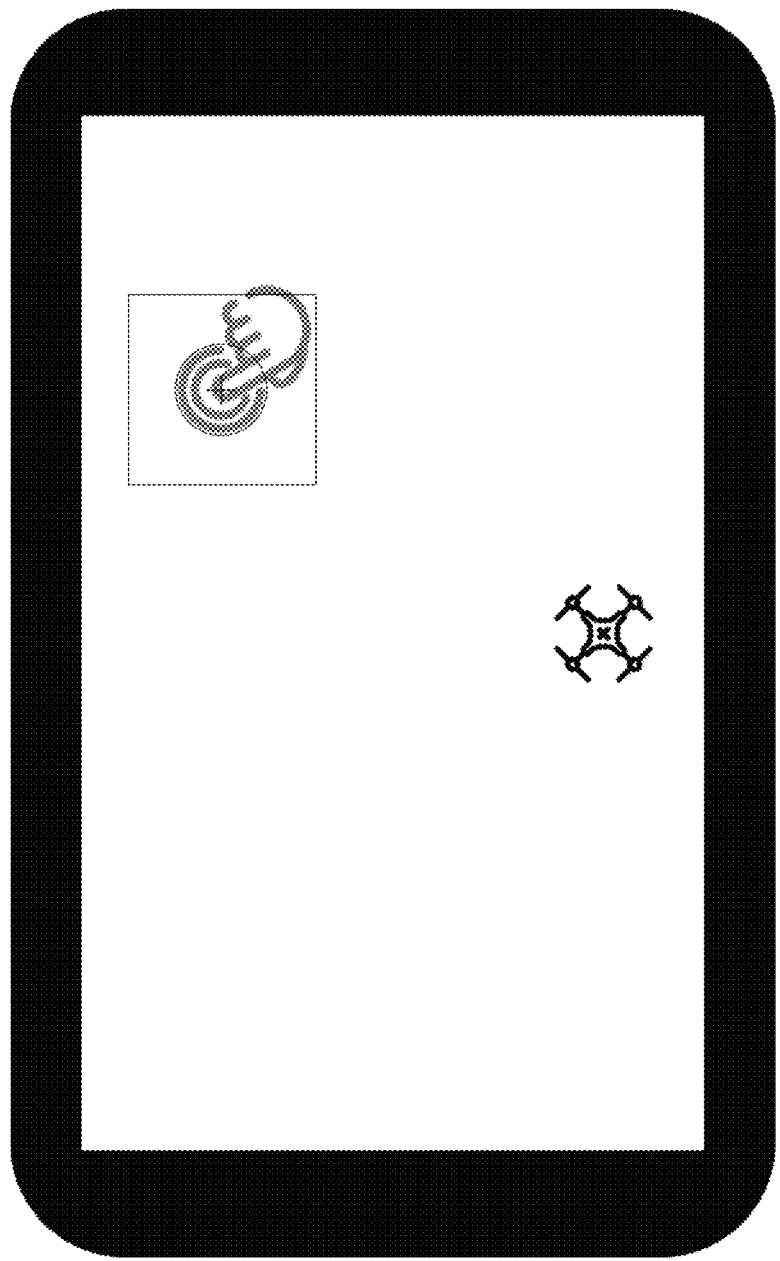
FIG. 4 is a representative screenshot depicting one aspect of an exemplary GUI interface implemented in accordance with aspects of the invention.

Now referring to FIG. 4, an exemplary screenshot of receiving, at the GUI 104, an objective from a user as a function of the user's interaction with the GUI 104 is illustrated. As described above, GUI 104 may be displayed through a device with touch screen capability. In one embodiment, user may select a point is space as an objective by touching the desired point on the screen. In one embodiment, GUI 104 may display landing locations where user may choose by clicking on the desired location. In a non-limiting example, user may be presented with buttons in a map representing landing locations, where user may choose the desired location by clicking on a button. In another nonlimiting example, user may be able to select an objective landing location and also an intermediate landing location, where controller will perform calculations as a function of the intermediate objective, and once reached, controller will calculate flight plan as a function of the final objective. In another nonlimiting example, user may choose from a list of maneuvers that the user would like to perform.

Figure 5:
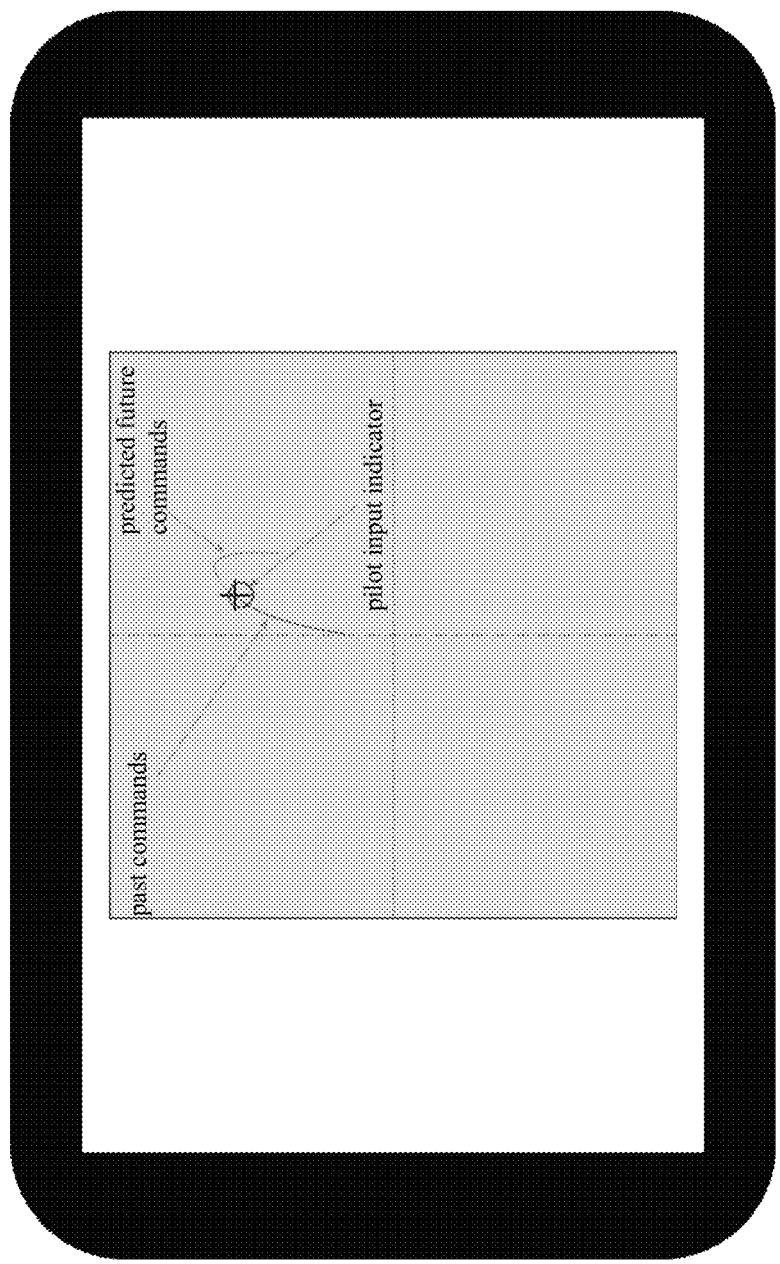
FIG. 5 is a representative screenshot depicting another aspect of an exemplary GUI interface implemented in accordance with aspects of the invention.

Now with reference to FIG. 5, an exemplary screenshot of displaying, at the GUI 104, the control input to the user is illustrated. As described above, GUI 104 may display the flight plan in graphical form. Graphical form may include a two-dimensional plot of two variables that represent data received by the controller, such as past maneuvers and predicted future maneuvers. In one embodiment, GUI 104 may also display the user's input in real-time. In one embodiment, GUI 104 may display the maneuver that was just performed by the user, the suggested maneuver to be performed and the maneuver being currently performed by the user. In one embodiment, GUI 104 will display a different suggested maneuver upon deviation by the user from flight plan. In a nonlimiting example, GUI may display different color schemes for immediate past maneuver, suggested immediate future maneuver, and the like.

Figure 6:
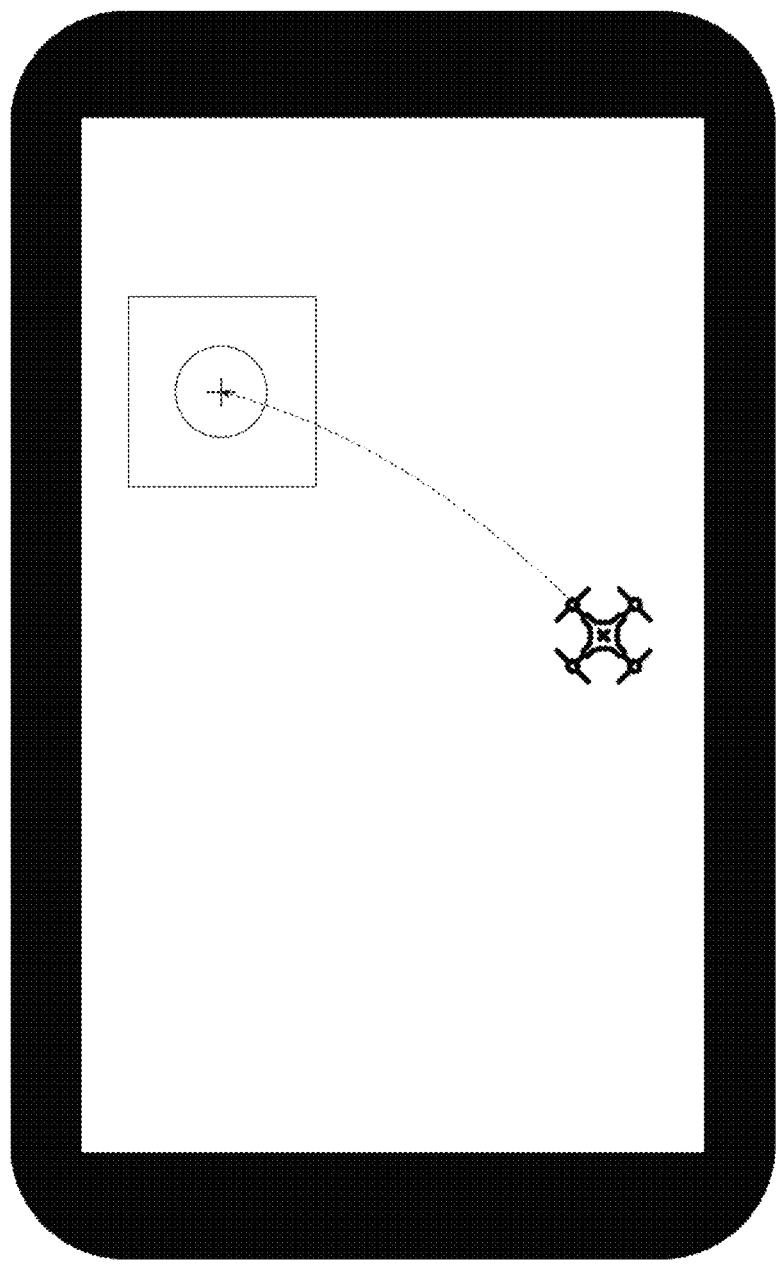
FIG. 6 is a representative screenshot depicting another aspect of an exemplary GUI interface implemented in accordance with aspects of the invention.

Now referring to FIG. 6, another exemplary screenshot of displaying, at the GUI 104, the control input to the user is illustrated. In one embodiment, additionally to the flight plan, GUI 104 may display objective and a directional line once objective is nearby. In one embodiment, GUI 104 may display a directional path to the objective when flight plan is set for an intermediate objective. In a nonlimiting example, GUI 104 may display a dotted path additionally to the suggested maneuvers and a graphical representation of the objective one user gets near the objective as to assist user when landing or reaching objective. In another nonlimiting example, GUI 104 may display a dotted line connected to the final objective as to keep user informed of direction of final objective when flight plan is set for an intermediate objective.

Figure 7:
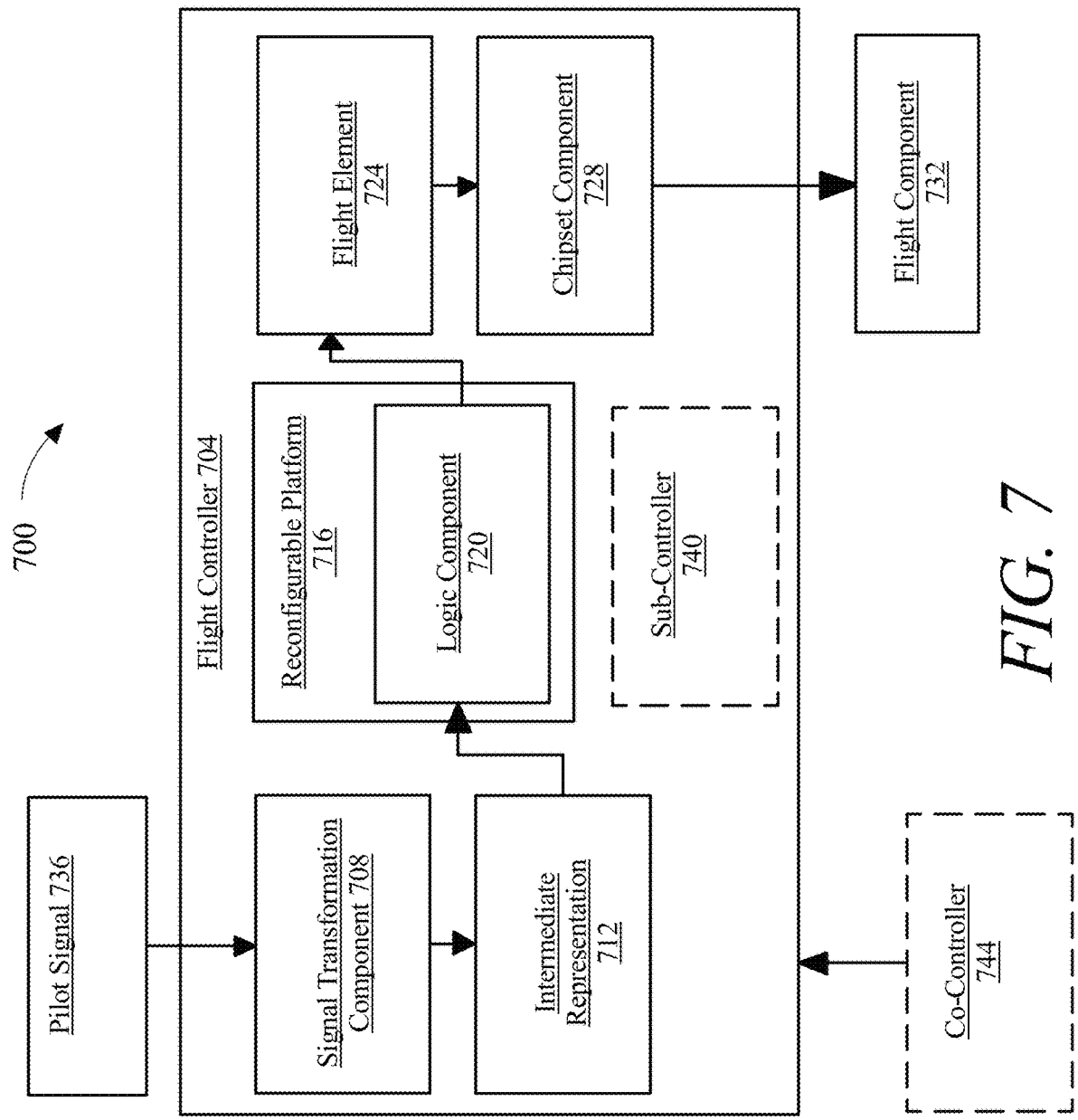
FIG. 7 is a block diagram illustrating a flight controller.

Now referring to FIG. 7, an exemplary embodiment 700 of a flight controller 704 is illustrated. Flight controller 704 may include and/or communicate with any computing device as described in this disclosure, including without limitation a microcontroller, microprocessor, digital signal processor (DSP) and/or system on a chip (SoC) as described in this disclosure. Further, flight controller 704 may include a single computing device operating independently, or may include two or more computing device operating in concert, in parallel, sequentially or the like; two or more computing devices may be included together in a single computing device or in two or more computing devices. In embodiments, flight controller 704 may be installed in an aircraft, may control the aircraft remotely, and/or may include an element installed in the aircraft and a remote element in communication therewith.

In an embodiment, and still referring to FIG. 7, flight controller 704 may include a signal transformation component 708. As used in this disclosure a "signal transformation component" is a component that transforms and/or converts a first signal to a second signal, wherein a signal may include one or more digital and/or analog signals. For example, and without limitation, signal transformation component 708 may be configured to perform one or more operations such as preprocessing, lexical analysis, parsing, semantic analysis, and the like thereof. In an embodiment, and without limitation, signal transformation component 708 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 708 may include transforming one or more low-level languages such as, but not limited to, machine languages and/or assembly languages. For example, and without limitation, signal transformation component 708 may include transforming a binary language signal to an assembly language signal. In an embodiment, and without limitation, signal transformation component 708 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 7, signal transformation component 708 may be configured to optimize an intermediate representation 712. As used in this disclosure an "intermediate representation" is a data structure and/or code that represents the input signal. Signal transformation component 708 may optimize intermediate representation as a function of a data-flow analysis, dependence analysis, alias analysis, pointer analysis, escape analysis, and the like thereof. In an embodiment, and without limitation, signal transformation component 708 may optimize intermediate representation 712 as a function of one or more inline expansions, dead code eliminations, constant propagation, loop transformations, and/or automatic parallelization functions. In another embodiment, signal transformation component 708 may optimize intermediate representation as a function of a machine dependent optimization such as a peephole optimization, wherein a peephole optimization may rewrite short sequences of code into more efficient sequences of code. Signal transformation component 708 may optimize intermediate representation to generate an output language, wherein an "output language," as used herein, is the native machine language of flight controller 704. For example, and without limitation, native machine language may include one or more binary and/or numerical languages.

In an embodiment, and without limitation, signal transformation component 708 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field/with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 7, flight controller 704 may include a reconfigurable hardware platform 716. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 716 may be reconfigured to enact any algorithm and/or algorithm selection process received from another computing device and/or created using machine-learning processes.

Still referring to FIG. 7, reconfigurable hardware platform 716 may include a logic component 720. As used in this disclosure a "logic component" is a component that executes instructions on output language. For example, and without limitation, logic component may perform basic arithmetic, logic, controlling, input/output operations, and the like thereof. Logic component 720 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 720 may be organized according to Von Neumann and/or Harvard architecture as a non-limiting example. Logic component 720 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 720 may include one or more integrated circuit microprocessors, which may contain one or more central processing units, central processors, and/or main processors, on a single metal-oxide-semiconductor chip. Logic component 720 may be configured to execute a sequence of stored instructions to be performed on the output language and/or intermediate representation 712. Logic component 720 may be configured to fetch and/or retrieve the instruction from a memory cache, wherein a "memory cache," as used in this disclosure, is a stored instruction set on flight controller 704. Logic component 720 may be configured to decode the instruction retrieved from the memory cache to opcodes and/or operands. Logic component 720 may be configured to execute the instruction on intermediate representation 712 and/or output language. For example, and without limitation, logic component 720 may be configured to execute an addition operation on intermediate representation 712 and/or output language.

In an embodiment, and without limitation, logic component 720 may be configured to calculate a flight element 724. As used in this disclosure a "flight element" is an element of datum denoting a relative status of aircraft. For example, and without limitation, flight element 724 may denote one or more torques, thrusts, airspeed velocities, forces, altitudes, groundspeed velocities, directions during flight, directions facing, forces, orientations, and the like thereof. For example, and without limitation, flight element 724 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 724 may denote that aircraft is following a flight path accurately and/or sufficiently.

Still referring to FIG. 7, flight controller 704 may include a chipset component 728. As used in this disclosure a "chipset component" is a component that manages data flow. In an embodiment, and without limitation, chipset component 728 may include a northbridge data flow path, wherein the northbridge dataflow path may manage data flow from logic component 720 to a high-speed device and/or component, such as a RAM, graphics controller, and the like thereof. In another embodiment, and without limitation, chipset component 728 may include a southbridge data flow path, wherein the southbridge dataflow path may manage data flow from logic component 720 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally, or alternatively, chipset component 728 may manage data flow between logic component 720, memory cache, and a flight component 732. As used in this disclosure a "flight component" is a portion of an aircraft that can be moved or adjusted to affect one or more flight elements. For example, flight component 732 may include a component used to affect the aircrafts' roll and pitch which may comprise one or more ailerons. As a further example, flight component 732 may include a rudder to control yaw of an aircraft. In an embodiment, chipset component 728 may be configured to communicate with a plurality of flight components as a function of flight element 724. For example, and without limitation, chipset component 728 may transmit to an aircraft rotor to reduce torque of a first lift propulsor and increase the forward thrust produced by a pusher component to perform a flight maneuver.

Still referring to FIG. 7, flight controller may include a sub-controller 740. As used in this disclosure a "sub-controller" is a controller and/or component that is part of a distributed controller as described above; for instance, flight controller 704 may be and/or include a distributed flight controller made up of one or more sub-controllers. For example, and without limitation, sub-controller 740 may include any controllers and/or components thereof that are similar to distributed flight controller and/or flight controller as described above. Sub-controller 740 may include any component of any flight controller as described above. Sub-controller 740 may be implemented in any manner suitable for implementation of a flight controller as described above. As a further non-limiting example, sub-controller 740 may include one or more processors, logic components and/or computing devices capable of receiving, processing, and/or transmitting data across the distributed flight controller as described above. As a further non-limiting example, sub-controller 740 may include a controller that receives a signal from a first flight controller and/or first distributed flight controller component and transmits the signal to a plurality of additional sub-controllers and/or flight components.

Still referring to FIG. 7, flight controller may include a co-controller 744. As used in this disclosure a "co-controller" is a controller and/or component that joins flight controller 704 as components and/or nodes of a distributer flight controller as described above. For example, and without limitation, co-controller 744 may include one or more controllers and/or components that are similar to flight controller 704. As a further non-limiting example, co-controller 744 may include any controller and/or component that joins flight controller 704 to distributer flight controller. As a further non-limiting example, co-controller 744 may include one or more processors, logic components and/or computing devices capable of receiving, processing, and/or transmitting data to and/or from flight controller 704 to distributed flight control system. Co-controller 744 may include any component of any flight controller as described above. Co-controller 744 may be implemented in any manner suitable for implementation of a flight controller as described above.

In an embodiment, and with continued reference to FIG. 7, flight controller 704 may be designed and/or configured to perform any method, method step, or sequence of method steps in any embodiment described in this disclosure, in any order and with any degree of repetition. For instance, flight controller 704 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 7, flight controller 704 may also be implemented using a "shared nothing" architecture in which data is cached at the worker, in an embodiment, this may enable scalability of aircraft and/or computing device. Flight controller 704 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks.

Figure 8:
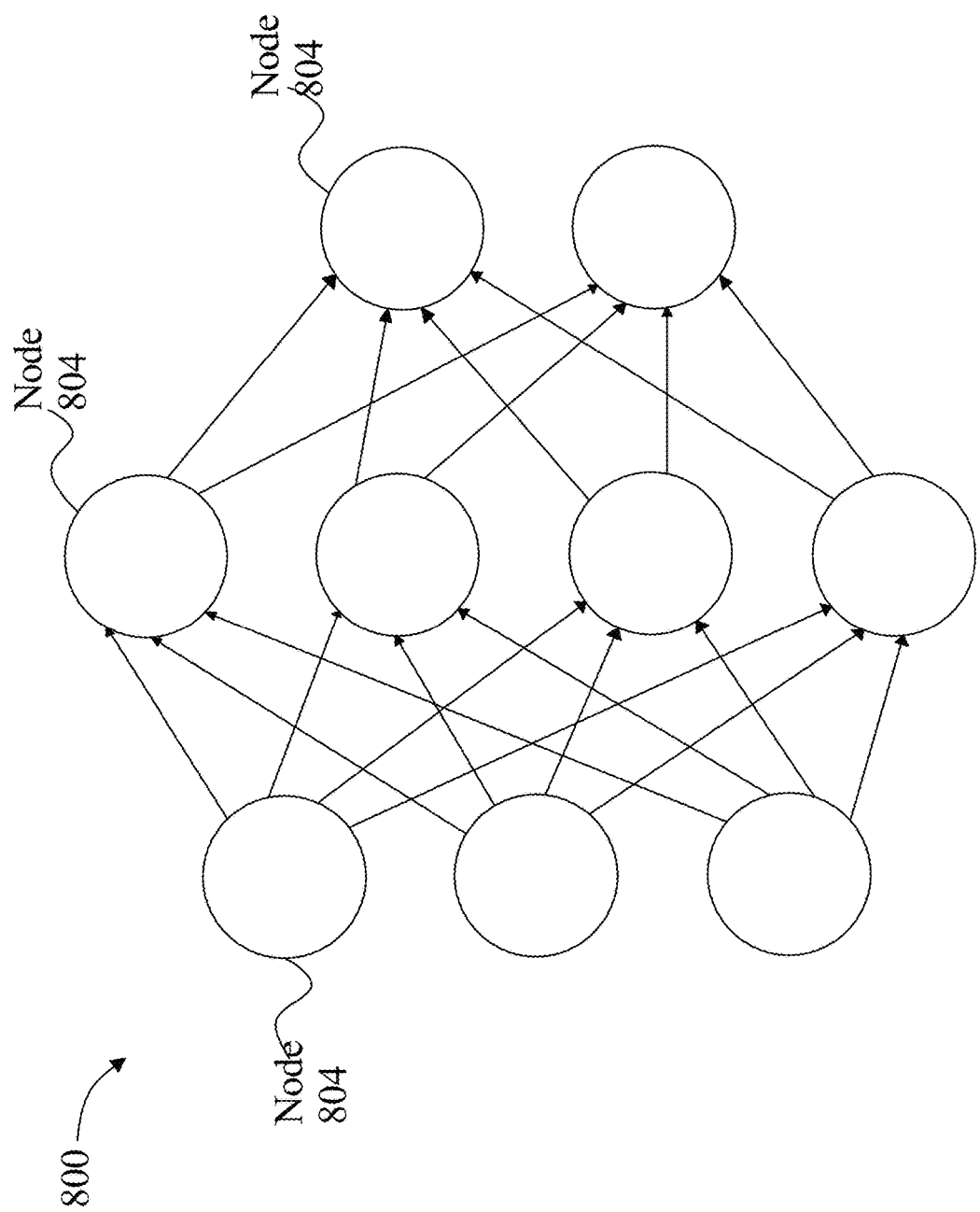
FIG. 8 is an exemplary embodiment of a neural network.

Referring now to FIG. 8, an exemplary embodiment of neural network 800 is illustrated. A neural network also known as an artificial neural network, is a network of "nodes," or data structures having one or more inputs, one or more outputs, and a function determining outputs based on inputs. Such nodes 804 may be organized in a network, such as without limitation a convolutional neural network, including an input layer of nodes 804, one or more intermediate layers, and an output layer of nodes 804. Connections between nodes 804 may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Figure 9:
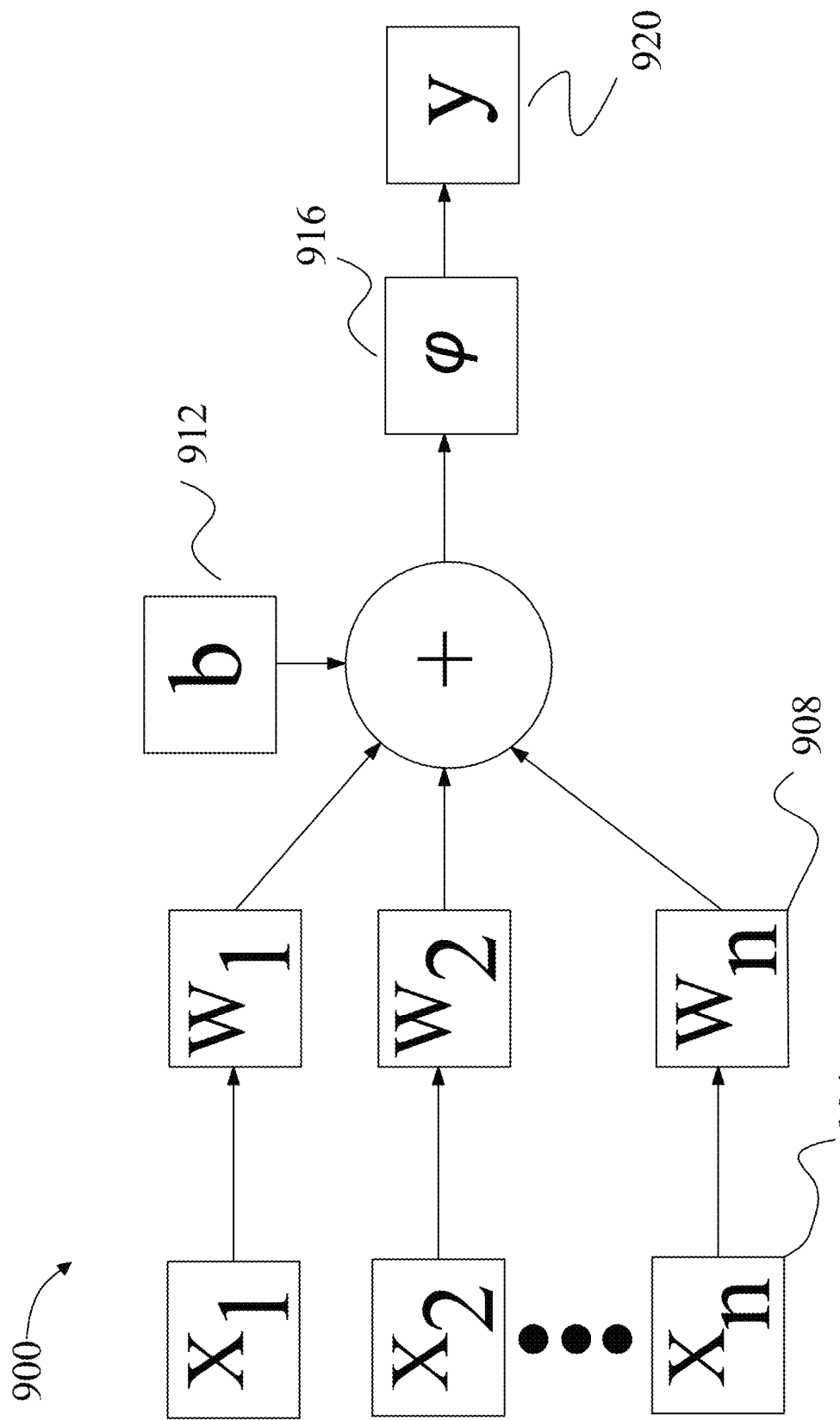
FIG. 9 is an exemplary embodiment of a node of a neural network.

Referring now to FIG. 9, an exemplary embodiment of a node 900 of a neural network 800 is illustrated. A node may include, without limitation a plurality of inputs $x_n$ 904 that may receive numerical values from inputs to a neural network containing the node and/or from other nodes. Node may perform a weighted sum of inputs using weights $w_n$ 908 that are multiplied by respective inputs $x_n$ 904. Additionally or alternatively, a bias b 912 may be added to the weighted sum of the inputs such that an offset is added to each unit in the neural network layer that is independent of the input to the layer. The weighted sum may then be input into a function φ 916, which may generate one or more outputs y 920. Weight $w_n$ 908 applied to an input $x_n$ 904 may indicate whether the input is "excitatory," indicating that it has strong influence on the one or more outputs y, for instance by the corresponding weight having a large numerical value, and/or a "inhibitory," indicating it has a weak effect influence on the one more inputs y 920, for instance by the corresponding weight having a small numerical value. The values of weights $w_n$ 908 may be determined by training a neural network using training data, which may be performed using any suitable process as described above. In an embodiment, and without limitation, a neural network may receive semantic units as inputs and output vectors representing such semantic units according to weights $w_n$ that are derived using machine-learning processes as described in this disclosure.

Figure 10:
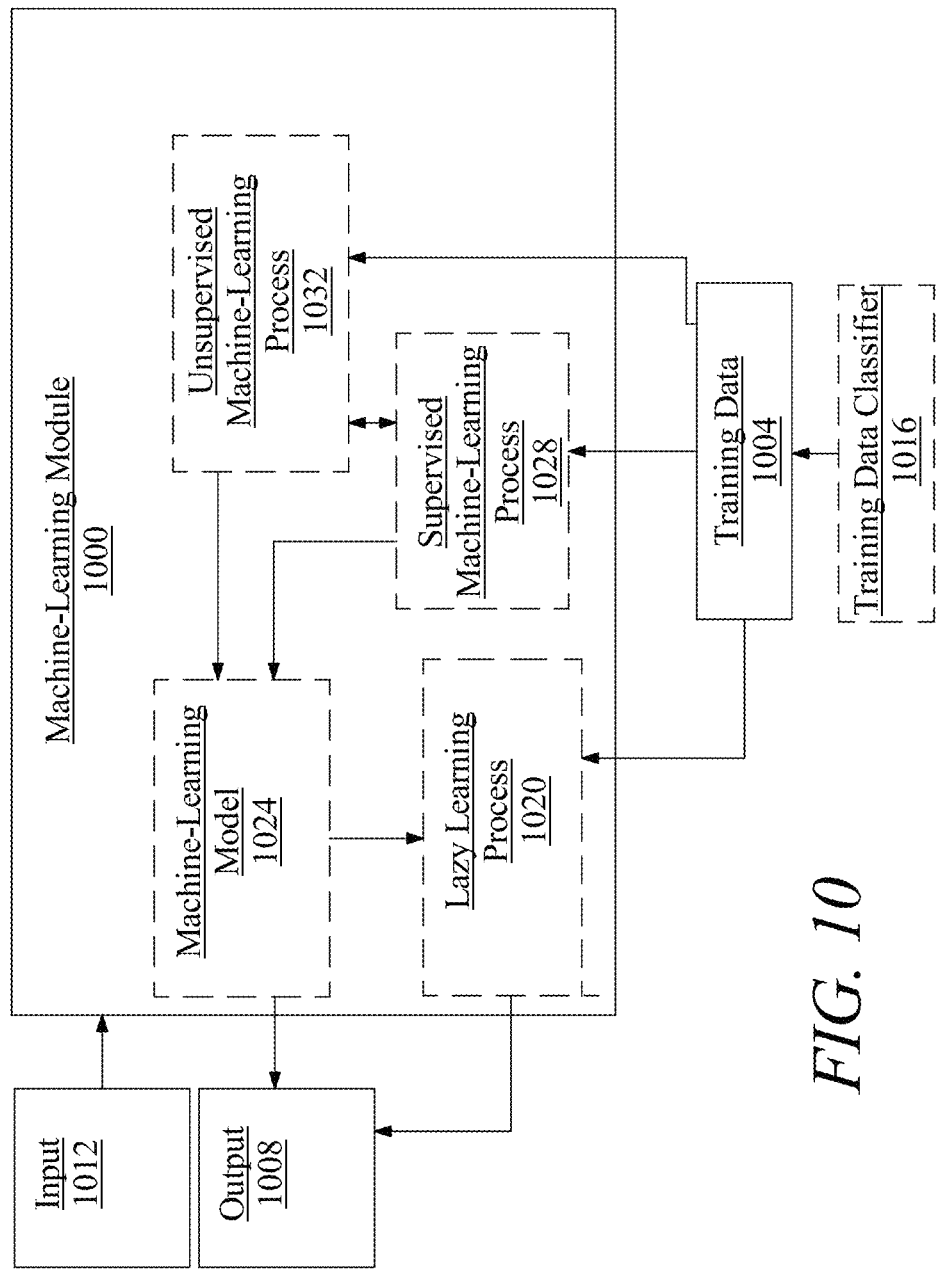
FIG. 10 is an exemplary embodiment of a machine learning module

Referring now to FIG. 10, an exemplary embodiment of a machine-learning module 1000 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1004 to generate an algorithm that will be performed by a computing device/module to produce outputs 1008 given data provided as inputs 1012; this is in contrast to a non-machine learning software program where the commands to be executed are determined in advance by a user and written in a programming language.

Still referring to FIG. 10, "training data," as used herein, is data containing correlations that a machine-learning process may use to model relationships between two or more categories of data elements. For instance, and without limitation, training data 1004 may include a plurality of data entries, each entry representing a set of data elements that were recorded, received, and/or generated together; data elements may be correlated by shared existence in a given data entry, by proximity in a given data entry, or the like. Multiple data entries in training data 1004 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1004 according to various correlations; correlations may indicate causative and/or predictive links between categories of data elements, which may be modeled as relationships such as mathematical relationships by machine-learning processes as described in further detail below. Training data 1004 may be formatted and/or organized by categories of data elements, for instance by associating data elements with one or more descriptors corresponding to categories of data elements. As a non-limiting example, training data 1004 may include data entered in standardized forms by persons or processes, such that entry of a given data element in a given field in a form may be mapped to one or more descriptors of categories. Elements in training data 1004 may be linked to descriptors of categories by tags, tokens, or other data elements; for instance, and without limitation, training data 1004 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 10, training data 1004 may include one or more elements that are not categorized; that is, training data 1004 may not be formatted or contain descriptors for some elements of data. Machine-learning algorithms and/or other processes may sort training data 1004 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1004 to be made applicable for two or more distinct machine-learning algorithms as described in further detail below. Training data 1004 used by machine-learning module 1000 may correlate any input data as described in this disclosure to any output data as described in this disclosure. As a non-limiting illustrative example flight elements and/or pilot signals may be inputs, wherein an output may be an autonomous function.

Further referring to FIG. 10, training data may be filtered, sorted, and/or selected using one or more supervised and/or unsupervised machine-learning processes and/or models as described in further detail below; such models may include without limitation a training data classifier 1016. Training data classifier 1016 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1000 may generate a classifier using a classification algorithm, defined as a processes whereby a computing device and/or any module and/or component operating thereon derives a classifier from training data 1004. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 10, machine-learning module 1000 may be configured to perform a lazy-learning process 1020 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1004. Heuristic may include selecting some number of highest-ranking associations and/or training data 1004 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 10, machine-learning processes as described in this disclosure may be used to generate machine-learning models 1024. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 1024 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1024 may be generated by creating an artificial neural network, such as a convolutional neural network comprising an input layer of nodes, one or more intermediate layers, and an output layer of nodes. Connections between nodes may be created via the process of "training" the network, in which elements from a training data 1004 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 10, machine-learning algorithms may include at least a supervised machine-learning process 1028. At least a supervised machine-learning process 1028, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1004. Persons skilled in the art, upon reviewing the entirety of this disclosure, will be aware of various possible variations of at least a supervised machine-learning process 1088 that may be used to determine relation between inputs and outputs. Supervised machine-learning processes may include classification algorithms as defined above.

Further referring to FIG. 10, machine learning processes may include at least an unsupervised machine-learning processes 1032. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 10, machine-learning module 1000 may be designed and configured to create a machine-learning model 1024 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 10, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 11:
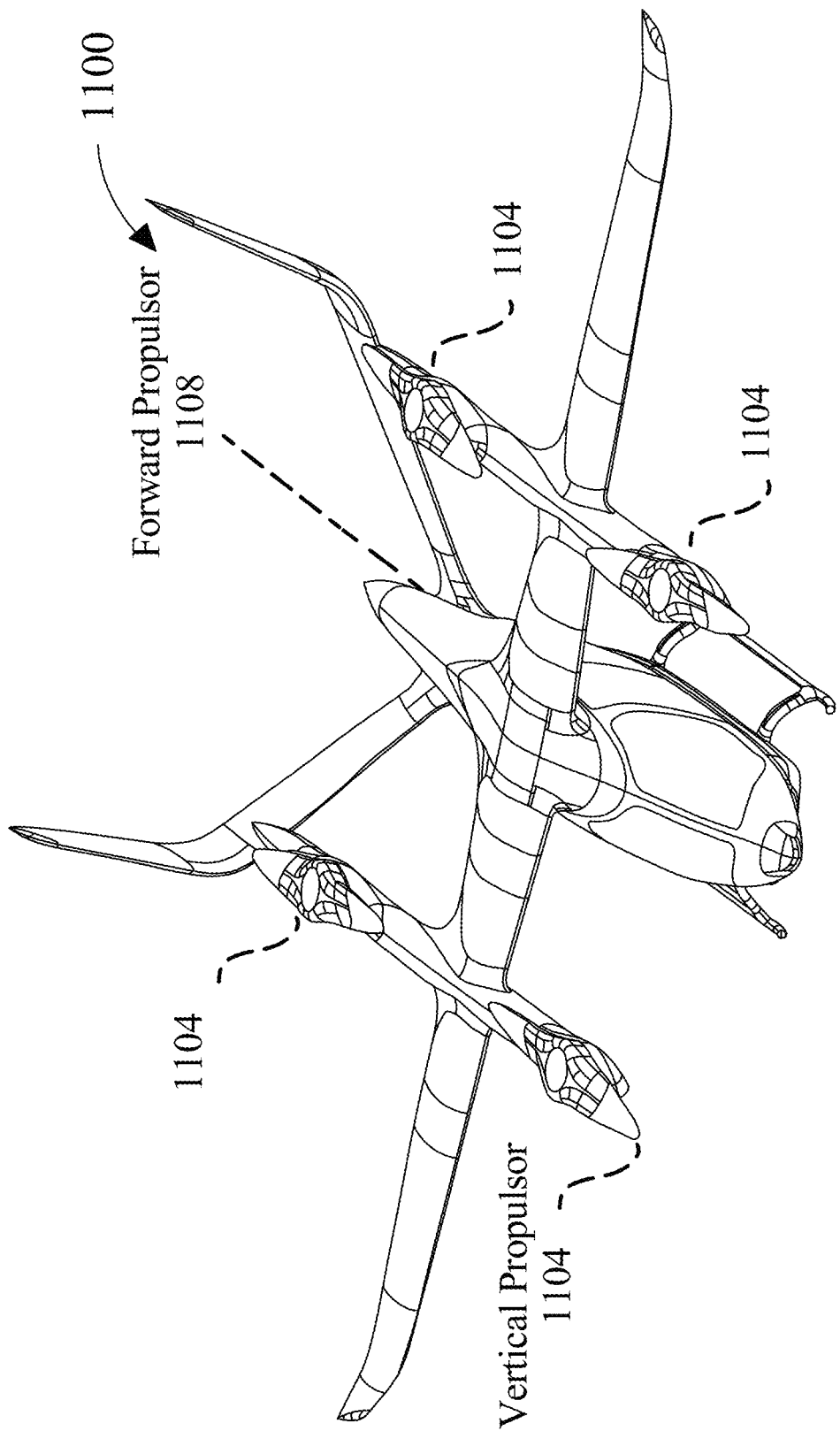
FIG. 11 is an illustrative embodiment of a VTOL aircraft.

Referring now to FIG. 11, an exemplary embodiment of a dual-mode aircraft 1100 that may incorporate assembly as illustrated. Aircraft may include at least a vertical propulsor 11046 and at least a forward propulsor 1108. A forward propulsor is a propulsor that propels the aircraft in a forward direction. Forward in this context is not an indication of the propulsor position on the aircraft; one or more propulsors mounted on the front, on the wings, at the rear, etc. A vertical propulsor is a propulsor that propels the aircraft in an upward direction; one of more vertical propulsors may be mounted on the front, on the wings, at the rear, and/or any suitable location. A propulsor, as used herein, is a component or device used to propel a craft by exerting force on a fluid medium, which may include a gaseous medium such as air or a liquid medium such as water. At least a vertical propulsor 1104 is a propulsor that generates a substantially downward thrust, tending to propel an aircraft in a vertical direction providing thrust for maneuvers such as without limitation, vertical take-off, vertical landing, hovering, and/or rotor-based flight such as "quadcopter" or similar styles of flight.

At least a forward propulsor 1108 as used in this disclosure is a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, takeoff, and/or landing, and/or may propel the aircraft forward or backward on the ground. At least a vertical propulsor 1104 and at least a forward propulsor 1108 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contrarotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft is in compression. Propulsors may include at least a motor mechanically coupled to the at least a first propulsor as a source of thrust. A motor may include without limitation, any electric motor, where an electric motor is a device that converts electrical energy into mechanical energy, for instance by causing a shaft to rotate. At least a motor may be driven by direct current (DC) electric power; for instance, at least a first motor may include a brushed DC at least a first motor, or the like. At least a first motor may be driven by electric power having varying or reversing voltage levels, such as alternating current (AC) power as produced by an alternating current generator and/or inverter, or otherwise varying power, such as produced by a switching power source. At least a first motor may include, without limitation, brushless DC electric motors, permanent magnet synchronous at least a first motor, switched reluctance motors, or induction motors. In addition to inverter and/or a switching power source, a circuit driving at least a first motor may include electronic speed controllers or other components for regulating motor speed, rotation direction, and/or dynamic braking. Persons skilled in the art, upon reviewing the entirety of this disclosure, will be aware of various devices that may be used as at least a thrust element.

During flight, a number of forces may act upon the electric aircraft. Forces acting on an aircraft 1100 during flight may include thrust, the forward force produced by the rotating element of the aircraft 1100 and acts parallel to the longitudinal axis. Drag may be defined as a rearward retarding force which is caused by disruption of airflow by any protruding surface of the aircraft 1100 such as, without limitation, the wing, rotor, and fuselage. Drag may oppose thrust and acts rearward parallel to the relative wind. Another force acting on aircraft 1100 may include weight, which may include a combined load of the aircraft 1100 itself, crew, baggage and fuel. Weight may pull aircraft 1100 downward due to the force of gravity. An additional force acting on aircraft 1100 may include lift, which may act to oppose the downward force of weight and may be produced by the dynamic effect of air acting on the airfoil and/or downward thrust from at least a propulsor. Lift generated by the airfoil may depends on speed of airflow, density of air, total area of an airfoil and/or segment thereof, and/or an angle of attack between air and the airfoil.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 12:
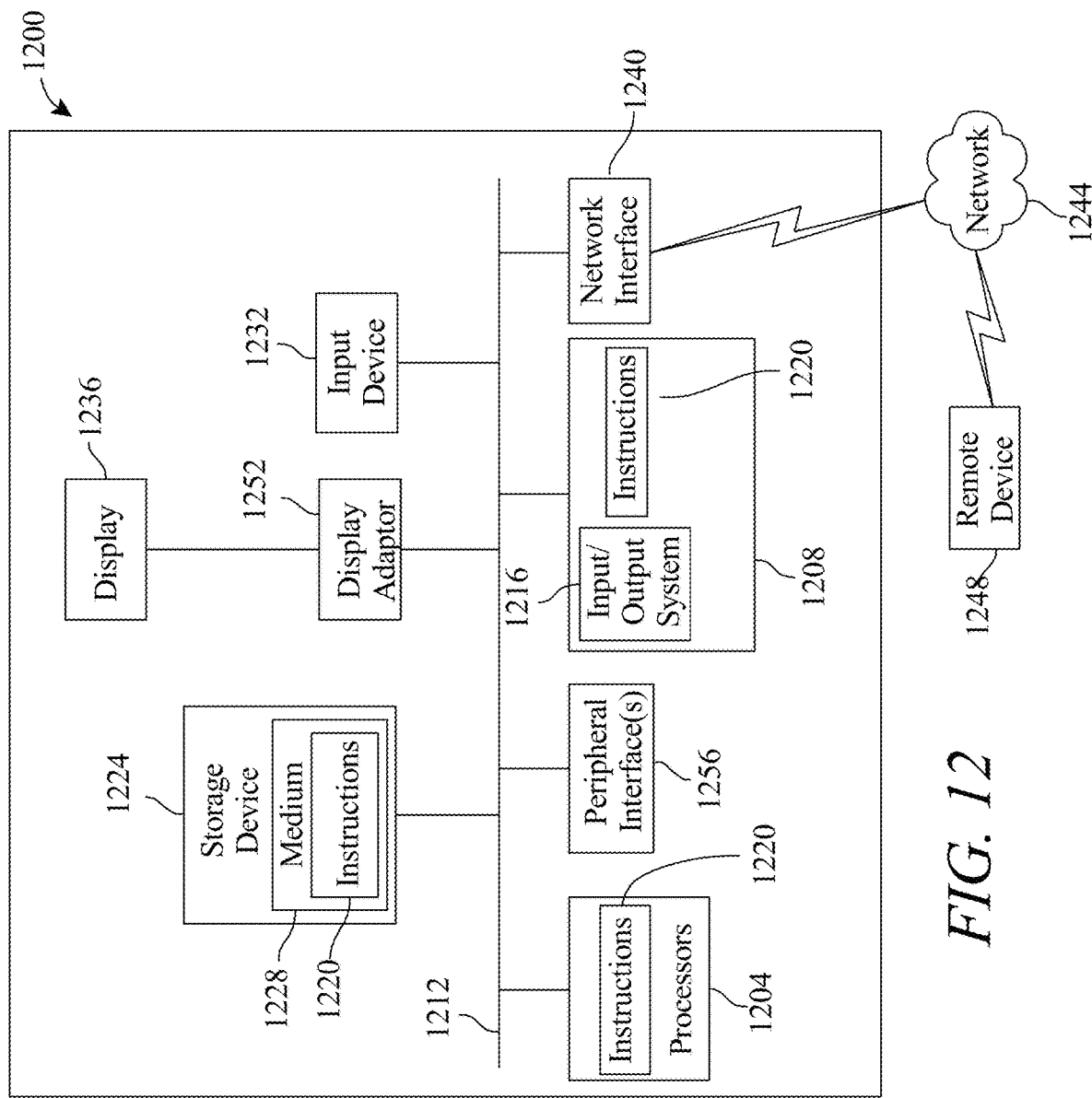
FIG. 12 is a diagrammatic representation of one embodiment of a computing device in the exemplary form of a computer system.

FIG. 12 shows a diagrammatic representation of one embodiment of a computing device in the exemplary form of a computer system 1200 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1200 includes a processor 1204 and a memory 1208 that communicate with each other, and with other components, via a bus 1212. Bus 1212 may include any of several types of bus structures including, but not limited to, a memory bus, a memory controller, a peripheral bus, a local bus, and any combinations thereof, using any of a variety of bus architectures.

Processor 1204 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1204 may be organized according to Von Neumann and/or Harvard architecture as a non-limiting example. Processor 1204 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 1208 may include various components (e.g., machine-readable media) including, but not limited to, a random-access memory component, a read only component, and any combinations thereof. In one example, a basic input/output system 1216 (BIOS), including basic routines that help to transfer information between elements within computer system 1200, such as during start-up, may be stored in memory 1208. Memory 1208 may also include (e.g., stored on one or more machine-readable media) instructions (e.g., software) 1220 embodying any one or more of the aspects and/or methodologies of the present disclosure. In another example, memory 1208 may further include any number of program modules including, but not limited to, an operating system, one or more application programs, other program modules, program data, and any combinations thereof.

Computer system 1200 may also include a storage device 1224. Examples of a storage device (e.g., storage device 1224) include, but are not limited to, a hard disk drive, a magnetic disk drive, an optical disc drive in combination with an optical medium, a solid-state memory device, and any combinations thereof. Storage device 1224 may be connected to bus 1212 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1224 (or one or more components thereof) may be removably interfaced with computer system 1200 (e.g., via an external port connector (not shown)). Particularly, storage device 1224 and an associated machine-readable medium 1228 may provide nonvolatile and/or volatile storage of machine-readable instructions, data structures, program modules, and/or other data for computer system 1200. In one example, software 1220 may reside, completely or partially, within machine-readable medium 1228. In another example, software 1220 may reside, completely or partially, within processor 1204.

Computer system 1200 may also include an input device 1232. In one example, a user of computer system 1200 may enter commands and/or other information into computer system 1200 via input device 1232. Examples of an input device 1232 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1232 may be interfaced to bus 1212 via any of a variety of interfaces (not shown) including, but not limited to, a serial interface, a parallel interface, a game port, a USB interface, a FIREWIRE interface, a direct interface to bus 1212, and any combinations thereof. Input device 1232 may include a touch screen interface that may be a part of or separate from display 1236, discussed further below. Input device 1232 may be utilized as a user selection device for selecting one or more graphical representations in a graphical interface as described above.

A user may also input commands and/or other information to computer system 1200 via storage device 1224 (e.g., a removable disk drive, a flash drive, etc.) and/or network interface device 1240. A network interface device, such as network interface device 1240, may be utilized for connecting computer system 1200 to one or more of a variety of networks, such as network 1244, and one or more remote devices 1248 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1244, may employ a wired and/or a wireless mode of communication. In general, any network topology may be used. Information (e.g., data, software 1220, etc.) may be communicated to and/or from computer system 1200 via network interface device 1240.

Computer system 1200 may further include a video display adapter 1252 for communicating a displayable image to a display device, such as display device 1236. Examples of a display device include, but are not limited to, a liquid crystal display (LCD), a cathode ray tube (CRT), a plasma display, a light emitting diode (LED) display, and any combinations thereof. Display adapter 1252 and display device 1236 may be utilized in combination with processor 1204 to provide graphical representations of aspects of the present disclosure. In addition to a display device, computer system 1200 may include one or more other peripheral output devices including, but not limited to, an audio speaker, a printer, and any combinations thereof. Such peripheral output devices may be connected to bus 1212 via a peripheral interface 1256. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A pilot-controlled position guidance (PCPG) system implemented in a vertical take-off and landing (VTOL) aircraft, the PCPG system comprising:
   a guidance controller communicatively connected to a graphical user interface (GUI) of a computing device utilized by a pilot of the VTOL aircraft, the guidance controller being configured to:
      receive an input from the GUI, the input indicating a selection of a desired maneuver or a location;
      determine, based on the input and a model state, a control input that includes a set of directions comprising an optimal control sequence of actions performed by the pilot to enable the VTOL aircraft to perform the desired maneuver or reach the location;
      determine, based on the model state, a set of predicted future maneuvers associated with the VTOL aircraft; and
      send, to the GUI of the computing device, the control input and the set of predicted future maneuvers for display to the pilot; and
   the GUI of the computing device, the GUI being configured to:
      receive the control input and the set of predicted future maneuvers from the guidance controller; and
      display the control input, including the set of directions and past maneuvers performed by the VTOL aircraft, and the set of predicted future maneuvers to the pilot of the VTOL aircraft.

2. The PCPG system of claim 1, wherein the VTOL aircraft is an electric vertical take-off and landing (eVTOL) aircraft.

3. The PCPG system of claim 1, wherein the guidance controller refrains from sending the control input to a flight controller of the VTOL aircraft.

4. The PCPG system of claim 1, wherein the input selects the location that corresponds to a point in space or a landing location.

5. The PCPG system of claim 1, wherein the input selects a landing location, and wherein an intermediate landing location can be added between a current location of the aircraft and the landing location.

6. The PCPG system of claim 1, wherein the control input comprises a flight plan, and wherein the guidance controller is further configured to:
   receive user data associated with real-time actions performed by the VTOL aircraft in association with the flight plan;
   determine a deviation from the flight plan; and
   determine, based on the input, a modified control input comprising a modified flight plan.

7. The PCPG system of claim 1, wherein the guidance controller determines the control input based on one of:
   an Adaptive Model Prediction Control algorithm; or
   a Neural Approximation method.

8. The PCPG system of claim 1, wherein the optimal control sequence of actions minimizes energy expenditure of the VTOL aircraft associated with performing the desired maneuver or reaching the location.

9. The PCPG system of claim 1, wherein the input selects a landing location and an intermediate location, and wherein the guidance controller is further configured to:
   determine, based on the intermediate location, the control input;
   receive user data associated with the VTOL aircraft;
   determine, based on the user data, that the VTOL aircraft has reached the intermediate location; and
   determine, based on the landing location, an updated control input comprising a new set of directions.

10. The PCPG system of claim 1, wherein the model state corresponds to a predicted state of the aircraft used to determine the optimal control sequence of actions.

11. A method for pilot-controlled position guidance, the method comprising:
   receiving, by a guidance controller of a vertical take-off and landing (VTOL) aircraft and from a graphical user interface (GUI) of a computing device communicatively connected to the guidance controller, an input received via the GUI, the input indicating a selection of a desired maneuver or a location;
   determining, by the guidance controller and based on the input and a model state, a control input that includes a set of directions comprising an optimal control sequence of actions performed by a pilot to enable the VTOL aircraft to perform the desired maneuver or reach the location;

determine, based on the model state, a set of predicted future maneuvers associated with the VTOL aircraft; and sending, from the guidance controller and to the GUI, the control input, including the set of directions and past maneuvers performed by the VTOL aircraft, and the set of predicted future maneuvers for display to the pilot of the VTOL aircraft.

12. The method of claim 11, wherein the VTOL aircraft is an electric vertical take-off and landing (eVTOL) aircraft.

13. The method of claim 11, wherein the guidance controller refrains from sending the control input to a flight controller of the VTOL aircraft.

14. The method of claim 11, wherein the location comprises a point in space or a landing location.

15. The method of claim 11, wherein the input selects a landing location, and wherein an intermediate landing location can be added between a current location of the VTOL aircraft and the landing location.

16. The method of claim 11, wherein the control input comprises a flight plan, the method further comprising:

receiving, by the guidance controller, user data associated with real-time actions performed by the VTOL aircraft in association with the flight plan;

determining, by the guidance controller and based on the user data, a deviation from the flight plan; and determining, by the guidance controller and based on the input, a modified set of directions.

17. The method of claim 11, wherein determining the control input comprises using an Adaptive Model Prediction Control algorithm.

18. The method of claim 17, wherein the model state is input as part of the Adaptive Model Prediction Control algorithm.

19. The method of claim 11, wherein the optimal control sequence of actions minimizes energy expenditure of the VTOL aircraft associated with performing the desired maneuver or reaching the location.

20. The method of claim 11, wherein determining the control input is based on using a Neural Approximation method.

* * * * *